United States Patent
Engler et al.

(10) Patent No.: US 9,366,351 B2
(45) Date of Patent: Jun. 14, 2016

(54) WATER TIGHT VALVE HAVING SEALED FLYING LEADS

(75) Inventors: Kevin J. Engler, St. Charles, IL (US); Russell A. Meyer, Crystal Lake, IL (US)

(73) Assignee: Robertshaw Controls Company, Itasca, IL (US)

(*) Notice: Subject to any disclaimer, the term of this patent is extended or adjusted under 35 U.S.C. 154(b) by 1357 days.

(21) Appl. No.: 12/823,289

(22) Filed: Jun. 25, 2010

(65) Prior Publication Data

US 2010/0327200 A1 Dec. 30, 2010

Related U.S. Application Data

(60) Provisional application No. 61/221,930, filed on Jun. 30, 2009.

(51) Int. Cl.
*F16K 27/02* (2006.01)
*F16K 31/06* (2006.01)

(52) U.S. Cl.
CPC ............ *F16K 27/029* (2013.01); *F16K 31/0644* (2013.01)

(58) Field of Classification Search
USPC ........... 137/1; 251/129.15, 1, 129.1; 439/606; 335/260
See application file for complete search history.

(56) References Cited

U.S. PATENT DOCUMENTS

| | | | | |
|---|---|---|---|---|
| 3,157,449 A | * | 11/1964 | Hennessey | 439/374 |
| 4,621,513 A | | 11/1986 | Bradford, Jr. | |
| 5,008,323 A | * | 4/1991 | Favstritsky et al. | 524/469 |
| 5,354,204 A | | 10/1994 | Hughes | |
| 5,499,981 A | | 3/1996 | Kordis | |
| 5,514,009 A | | 5/1996 | Hughes | |
| 5,647,870 A | | 7/1997 | Kordis et al. | |
| 5,725,525 A | | 3/1998 | Kordis | |
| 5,823,189 A | | 10/1998 | Kordis | |
| 5,888,443 A | | 3/1999 | Bolanos et al. | |
| 5,893,847 A | | 4/1999 | Kordis | |
| 5,928,228 A | | 7/1999 | Kordis et al. | |
| 6,864,772 B2 | * | 3/2005 | Callis et al. | 335/260 |
| 7,294,008 B2 | * | 11/2007 | Fukuyama | 439/287 |
| 7,396,143 B2 | | 7/2008 | Sloan | |
| 2008/0158860 A1 | | 7/2008 | Sloan | |

* cited by examiner

*Primary Examiner* — John K Fristoe, Jr.
*Assistant Examiner* — Daphne M Barry
(74) *Attorney, Agent, or Firm* — Reinhart Boerner Van Deuren P.C.

(57) ABSTRACT

A water tight valve with sealed flying leads is presented. The sealing is provided by an adhesive heat shrink collar that is affixed to the insulation of the flying leads. An overmolding is used to provide further protection of the terminal/wire contact interface and to seal against the exterior surface of the collar. The profile of the collar also provides a tortuous path that further prevents the ingress of any conductive fluid to the wire/terminal contact area.

10 Claims, 1 Drawing Sheet

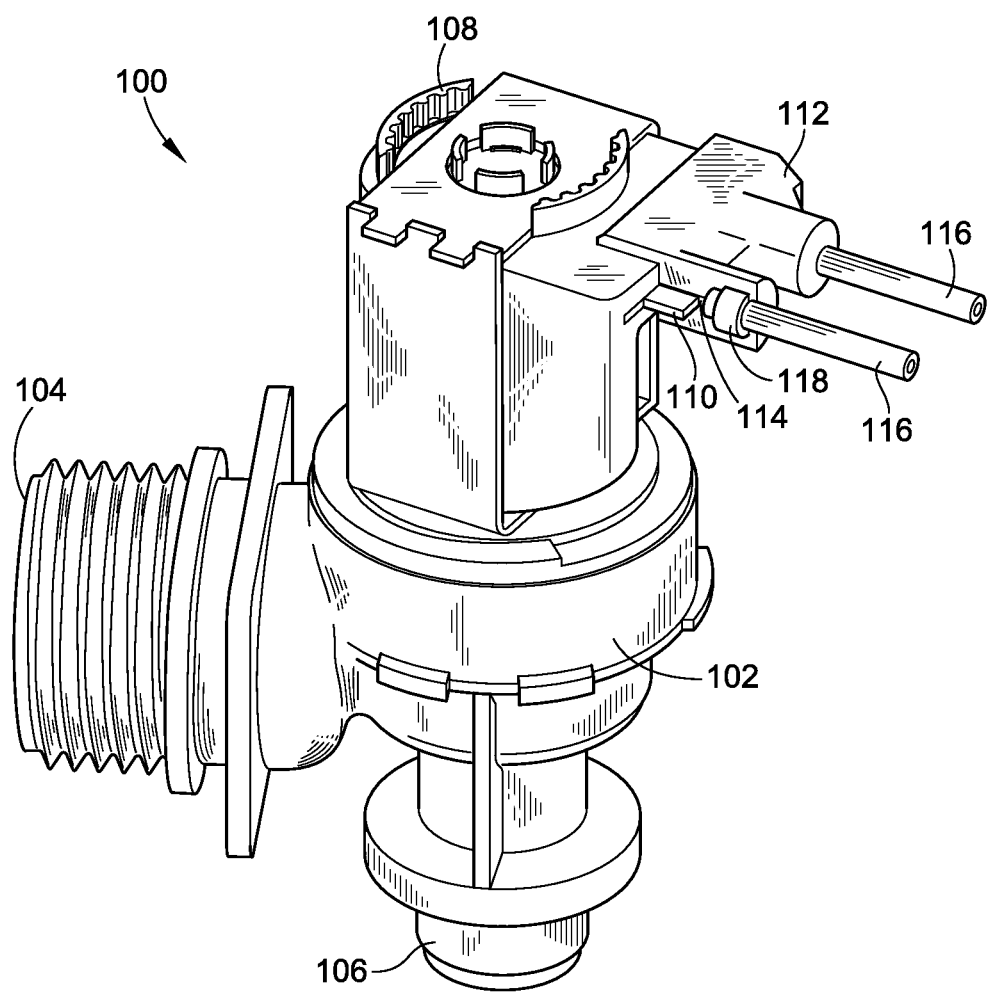

WATER TIGHT VALVE HAVING SEALED FLYING LEADS

CROSS-REFERENCE TO RELATED PATENT APPLICATIONS

This patent application claims the benefit of U.S. Provisional Patent Application No. 61/221,930, filed Jun. 30, 2009, the entire teachings and disclosure of which are incorporated herein by reference thereto.

FIELD OF THE INVENTION

The present invention relates generally to solenoid controlled water valves, and more particularly to water tight sealing of electrical leads to solenoid terminals for use in such valves.

BACKGROUND OF THE INVENTION

Most modern consumer and commercial appliances utilize some form of electronic or electromechanical control of the various operating cycles thereof. In, for example, consumer and commercial washing machines and dish washers, such controls enable the use of solenoid controlled water valves to begin and end the various fill and rinse cycles typical for such appliances.

While the particular controller for such appliances is typically housed in a somewhat protected area of the appliance, or utilizes some form of conformal coating to protect the control circuitry from short circuits that may otherwise be caused from water and/or liquid detergents that may come into contact therewith, the solenoid controlled water valves are typically installed in much harsher environments wherein the likelihood of water, suds, liquid detergents, and other contaminants caused by operation of the appliance and or cleaning by the operator is substantially greater. Unfortunately, the sealing of such wire terminated components has proven extremely difficult to achieve in such environments.

Indeed, in appliances such as laundry and dish washers, the event of over flow or leakage is quite common, and it is not unusual for a homeowner to attempt to clean the appliance using conductive acidic or detergent cleaners. Such low dielectric fluids would have a shorting effect on high power connections such as motors and/or valve components, if located in the path of such fluid leaks. Electrical controls are generally located high in the appliance and protected by enclosures. However, other components that are powered by leaded wires are prone to fluids wicking down the leads to the bare or unsealed terminals and junctions. Vibration, inherent in such machines or appliances, adds another degree of concern. When the wire lead is allowed to move and flex, traditional attempts to seal usually fail.

In the past, manufactures have tried various expensive and laborious methods, such as topical adhesives, sealants, ultrasonic methods, etching, etc., to provide a water tight seal. Unfortunately, many such wire terminated components such as the solenoid controlled water valves discussed above utilize flexible wires know as flying leads that contain a large amount of plasticizer and lubricants in the wire coating insulation. Such plasticizers and lubricants prevent good adhesion of sealants and adhesives to the joint. As such, water, detergents, and conductive cleaning fluids to which these components are subjected often eventually results in short circuits.

Some manufactures have attempted to overcome this problem by assembling the wire terminated components, i.e. attaching the flexible wire leads to the electrical terminals of the solenoid, and then overmolding the assembly to encapsulate the solenoid, electrical terminals, and a portion of the flexible wires attached to the solenoid terminals. Unfortunately, overmolding materials that provide good adhesion to the solenoid coils do not provide good adhesion to the insulation on the wires and vice versa. Such over-molded assemblies must rely on the minimal adhesion of the dissimilar plastics to seal the joints. This attempt, particularly when used with flexible wire, proves ineffective to low dielectric solutions that can wick down into the joint between the wire insulation and the plastic over-molded material. As a result, dielectric breakdown also often eventually occurs when such components are subjected to continuous or continual exposure to conductive fluids. Such joints do not bond in a hermetic "water tight" type seal.

There is a need, therefore, for wire terminated electrical components, such as solenoid controlled water valves, that can make use of a low cost sealing technique that will prevent or substantially reduce the occurrence of short circuits caused by continual exposure to conductive fluids. Embodiments of the present invention provide a system and method for achieving such results.

BRIEF SUMMARY OF THE INVENTION

In view of the above, embodiments of the present invention provide a new and improved wire terminated electrical component that utilizes a sealing system and method to substantially reduce or eliminate the ingress of fluids to the wire/terminal connection point. More particularly, embodiments of the present invention provide a new and improved system and method for sealing electrical leaded components such as solenoid controlled water valves that are continually or likely to be exposed to conductive fluids.

In one embodiment, a solenoid controlled water valve is presented. The water valve includes a solenoid for activation of a valving element therein. Connection of electric power to the solenoid is accomplished via electrical leads that are affixed to the terminals of the solenoid. These electrical leads are covered by an insulating cover except where they are attached to the electrical terminals of the solenoid. A sealing collar of adhesive heat shrink is attached to the insulating cover of the wire in close proximity but displaced from the point at which the electrical insulation begins near the connection to the solenoid terminal. At least the electrical terminal portion of the solenoid and a portion of the insulated wires, including the portion having the shrink wrap collar are overmolded. Preferably, the material used to overmold this portion of the assembly is a plastic material, such as polypropylene or the like, that provides adhesion to itself as well as to the collar outer material and/or the adhesive lining, completing the seal.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a partial cutaway isometric illustration of an embodiment of a solenoid controlled water valve constructed in accordance with the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there is illustrated in FIG. 1 an embodiment of an electrical leaded component in the form of a solenoid controlled water valve 100, usable in, for example, consumer and commercial appliances. While FIG. 1 illustrates one embodiment of an electrical leaded component to which the teachings of the present invention find particular applicability, those skilled in the art will recognize from the following description that other embodiments will also benefit from the teachings of the present invention. As such, the following description should be taken by way of example, and not by way of limitation.

The solenoid controlled water valve 100 includes a valve body 102 that defines a valving chamber (not shown) therein, a water inlet 104 and a water outlet 106. As will be recognized by those skilled in the art, the valving chamber includes a valving member that controls the flow of water from the water inlet 104 to the water outlet 106. The solenoid controlled water valve 100 also includes a solenoid 108 mounted on the valve body 102 to control actuation of the valving member in response to electrical current supplied by the appliance controller (not shown).

As is known, the solenoid 108 includes a pair of electrical terminals 110 (only one terminal 110 being visible due to the partial cutaway of the overmolding 112). To supply electric power to the terminals 110 of the solenoid 108, a pair of wires 114 are attached to the pair of electrical terminals 110 of the solenoid 108. Such attachment may be performed by soldering, welding, etc. as known in the art.

As is typical, each of the wires 114 are covered by insulation 116. This insulation 116 is stripped from the wire 114 at the terminal connection end so that the wire 114 itself can be in electrical contact with the solenoid terminals 110. Typically, the wire insulation 116 is made from a polyvinylchloride (PVC) material that contains plasticizers and lubricants as discussed above, which is the source for the inability to properly seal such material using prior methods. This insulation 116 is necessary, for example, to achieve 300 volt UL recognition for a 20 gauge, 7 strand wire used in the exemplary embodiment of FIG. 1.

A small collar 118 formed from adhesive heat shrink tubing is attached to the outer surface of the insulation 116 near, but preferably displaced from, the end of the insulation where the wire 114 is attached to the terminal 110. In a preferred embodiment, the collar 118 is approximately ⅛ inch in width, and is heat shrunk into place on the insulation 116 approximately 1/10 inch from the end of the insulation 116 formed when the insulation 116 is stripped away to reveal wire 114. In one embodiment a Tyco-Raychem adhesive heat shrink is utilized to form the collar 118. During the heat shrink process, the collar 118 adhesively bonds tightly to the insulation 116 around each of the wires 114, providing a water tight seal.

Once the wires 114 with the collar 118 in place on each thereof have been attached to the terminals 110, the solenoid 108 is then overmolded using a plastic material, such as a polypropylene plastic material. This overmolding 112 overcoats or covers the wire 114 and terminal 110 junction, and bonds tightly to the exterior surface of the heat shrink collar 118. Since the collar 118 includes the adhesive on its interior surface that tightly bonds to the insulation 116 and tightly bonds to the overmolding 112 on its exterior surface, the collar 118 creates a dielectric and water resistant seal to protect the wire 114 and terminal 110 from short circuits introduced by exposure to conductive liquids. Further, the rectangular shape of the collar 118 provides additional surface area and bends in the path from the exterior to the wire 114 terminal 110 connection, which tends to increase the difficulty that water or other conductive fluids have in penetrating the joint. It should be recognized that, since the collars 118 are heat shrunk onto the wires 114, the rectangular shape may be somewhat rounded, as opposed to a true geometric rectangle, and such is considered to be within the scope of the phrase "rectangular shape" as used herein.

As will now be recognized by those skilled in the art from the foregoing description, utilizing an adhesive heat shrink material to form a collar 118 around the insulation 116 prevents or reduces water and conductive fluid seepage along the insulation 116 to the wire 114 terminal 110 contact area. Further, the overmolding 112 also bonds to the exterior surface of the collar 118 forming a seal which prevents or reduces the ability of water and conductive fluids from seeping around the collar 118 to the wire 114 terminal 110 contact area. The overmolding 112 itself protects the wire 114 and terminal 110 from water or conductive fluid ingress from other directions. Such a sealing technique may find applicability in any wired electrical component that is likely to be exposed to such an operating environment.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A solenoid controlled water valve, comprising:
   a solenoid mounted on a valve body for control of a valving member housed therein, the solenoid having a pair of electrical terminals;
   a pair of wires attached to each of the pair of electrical terminals, each wire having insulation therearound, the insulation terminating at a termination end to expose a portion of the wire attached to the electrical terminal;
   a pair of adhesive heat shrink collars attached to the insulation of each the pair of wires in close proximity but displaced from the termination end; and
   an overmolding covering at least the pair of electrical terminals of the solenoid and at least a portion of the wires, including the pair of collars.

2. The solenoid controlled water valve of claim 1, wherein the overmolding extends beyond the heat shrink collars to encapsulate the heat shrink collars within the overmolding.

3. The solenoid controlled water valve of claim 1, wherein the pair of adhesive heat shrink collars includes adhesive on an interior surface thereof such that an adhesive bond between the interior surface of the heat shrink collar and an external surface of the insulation of the wire is formed.

4. The solenoid controlled water valve of claim 3, wherein the adhesive bond forms a water tight seal between the heat shrink collar and the insulation of the wire.

5. The solenoid controlled water valve of claim 1, wherein the overmolding comprises a plastic material.

6. The solenoid controlled water valve of claim 5, wherein the overmolding comprises polypropylene.

7. The solenoid controlled water valve of claim 6, wherein the insulation comprises polyvinylchloride (PVC).

8. The solenoid controlled water valve of claim 1, wherein the pair of collars are rectangular-shaped to provide additional surface area and bends in a path along an interior of the overmolding from an exterior of the overmolding to the electrical terminal.

9. The solenoid controlled water valve of claim 8, wherein each of the pair of collars are approximately ⅛ inch in width.

10. The solenoid controlled water valve of claim 9, wherein each of the pair of collars are positioned on the insulation approximately 1/10 inch from the termination end.

\* \* \* \* \*